(12) United States Patent
Bal et al.

(10) Patent No.: US 9,950,315 B2
(45) Date of Patent: Apr. 24, 2018

(54) NI—MGO—ZNO SOLID CATALYSTS FOR SYNGAS PREPARATION AND PROCESS FOR THE PREPARATION THEREOF

(71) Applicant: COUNCIL OF SCIENTIFIC & INDUSTRIAL RESEARCH, New Dehli (IN)

(72) Inventors: Rajaram Bal, Dehradun (IN); Rajib Kumar Singha, Dehradun (IN); Chandrashekar Pendem, Dehradun (IN); Laxmi Narayan Siva Kumar Konathala, Dehradun (IN); Ankur Bordoloi, Dehradun (IN); Sandeep Saran, Dehradun (IN)

(73) Assignee: Council of Scientific & Industrial Research, New Delhi (IN)

( * ) Notice: Subject to any disclaimer, the term of this patent is extended or adjusted under 35 U.S.C. 154(b) by 219 days.

(21) Appl. No.: 14/842,301

(22) Filed: Sep. 1, 2015

(65) Prior Publication Data

US 2016/0059217 A1 Mar. 3, 2016

(30) Foreign Application Priority Data

Sep. 2, 2014 (IN) .......................... 2508/DEL/2014

(51) Int. Cl.
| | |
|---|---|
| *B01J 23/60* | (2006.01) |
| *B01J 23/80* | (2006.01) |
| *B01J 37/04* | (2006.01) |
| *B01J 37/03* | (2006.01) |
| *B01J 37/00* | (2006.01) |

(Continued)

(52) U.S. Cl.
CPC ............ *B01J 23/80* (2013.01); *B01J 37/009* (2013.01); *B01J 37/031* (2013.01); *B01J 37/04* (2013.01); *B01J 37/08* (2013.01); *C01B 3/40* (2013.01); *C01B 2203/0238* (2013.01); *C01B 2203/1058* (2013.01); *C01B 2203/1076* (2013.01); *C01B 2203/1241* (2013.01); *Y02P 20/142* (2015.11); *Y02P 20/52* (2015.11)

(58) Field of Classification Search
CPC .................................. B01J 23/80; B01J 37/04
USPC ........................................................ 505/329
See application file for complete search history.

(56) References Cited

U.S. PATENT DOCUMENTS

| | | | |
|---|---|---|---|
| 2007/0253886 A1 | 11/2007 | Abatzoglou et al. | |
| 2008/0125311 A1* | 5/2008 | Baek ........................ | B01J 23/80 502/201 |
| 2012/0321996 A1* | 12/2012 | Ito ....................... | H01M 4/8657 429/524 |

OTHER PUBLICATIONS

Slade, DA et al., "Mixed-conducting oxygen permeable ceramic membranes for the carbon dioxide reforming of methane," Green Chem 2007, 9 (6): 577-581, First published online Feb. 1, 2007, Royal Society of Chemistry, UK.

(Continued)

*Primary Examiner* — Paul Wartalowicz
(74) *Attorney, Agent, or Firm* — Sterne, Kessler, Goldstein & Fox, P.L.L.C.

(57) ABSTRACT

The present invention provides a process and catalyst for the production of synthesis gas (a mixture of CO and $H_2$) by reforming of methane with carbon dioxide. The process provides a direct single step selective vapor phase dry reforming of methane with carbon dioxide to produce synthesis gas over Ni—MgO—ZnO catalyst between temperature range of 600° C. to 800° C. at 1 atmospheric pressure. The process provides a methane conversion of 5-95% with $H_2$ to CO mole ratio of 0.83-1.2.

2 Claims, 14 Drawing Sheets

(51) Int. Cl.
  *B01J 37/08*  (2006.01)
  *C01B 3/40*  (2006.01)

(56) References Cited

OTHER PUBLICATIONS

Sarusi, I et al., "CO2 reforming of $CH_4$ on doped $Rh/Al_2O_3$ catalysts," Catalysis Today 171 (1): 132-139 (Aug. 10, 2011), Elsevier B.V., Netherlands.

Naeem, MA et al., "Syngas production from dry reforming of methane over nano Ni polyol catalysts," Internat J Chem Engin Appl 4(5): 315-320 (Oct. 2013), IJCEA.

Jung, KS et al., "Ni/γ-$Al_2O_3$ catalyst prepared by liquid phase oxidation for carbon dioxide reforming of methane," Bull Korean Chem Soc 1999, 20(1): 89-94, The Korean Chem Soc, Seoul, South Korea.

Kado, S et al., "Low temperature reforming of methane to synthesis gas with direct current pulse discharge method," Chem Comm issue 5, 415-416, (Mar. 2001; First published online Feb. 13, 2001), The Royal Soc Chemistry, Cambridge, UK.

Peters, A et al., "Nickel-loaded zirconia catalysts with large specific surface area for high-temperature catalytic applications," ChemCatChem 3:598-606, (Mar. 2011; First published online Jan. 10, 2011), Wiley-VCH, Weinheim, Germany.

Xu, L et al., "One-Pot Synthesis of Ordered Mesoporous NiO—CaO—$Al_2O_3$ Composite Oxides for Catalyzing $CO_2$ Reforming of $CH_4$," ACS Catal. 2012, 2 (7), pp. 1331-1342, (Publication Date (Web): May 22, 2012), Am Chem Soc, Washington, DC.

Brungs, AJ et al., "Dry reforming of methane to synthesis gas over supported molybdenum carbide catalysts," Catalysis Letters 70:117-122 (Dec. 2000), J.C. Balzer AG, Basel, Switzerland.

Bouarab, R et al., "Reforming of methane by $CO_2$ in presence of cobalt-based catalysts," Green Chem 2003, 5: 209-212, First published online Mar. 18, 2003, Royal Society of Chemistry, UK.

Nagaoka, K et al, "Titania supported ruthenium as a coking-resistant catalyst for high pressure dry reforming of methane," Catalysis Comm 2: 255-260, (Aug. 2001), Elsevier Science B.V., Netherlands.

\* cited by examiner

NI—MGO—ZNO SOLID CATALYSTS FOR SYNGAS PREPARATION AND PROCESS FOR THE PREPARATION THEREOF

FIELD OF INVENTION

The present invention relates to a catalyst for vapor phase reforming of methane with carbon dioxide for the production of synthesis gas (mixture of carbon monoxide and hydrogen) and process for the preparation thereof. Particularly, the present invention relates to a process for the carbon dioxide reforming of methane to syngas over Ni—MgO—ZnO solid catalysts. More particularly, the present invention relates to a process for the vapor phase carbon dioxide reforming of methane to syngas by using a coke resistant Ni—MgO—ZnO catalyst.

BACKGROUND OF THE INVENTION

Protection of the environment is a topic of fundamental importance of mankind. Various factors contribute to pollute the environment, which has become a major concern on a global scale. Developed countries and the developing ones have come together to establish national programs to fight against the various source of pollution. The climate perturbations caused by the greenhouse effect, the depletion of the ozone layer, acid rain are the effects of global pollution.

Natural gasses are considered to be one of the most clean and ecological energy for the future and it is considered to be one area of competitiveness for the various oil companies. In recent years dry reforming of methane has become one of the most commonly used process to produce high value added products using two greenhouse gases. Global demand for cleaner energy is increasing and clean hydrogen in the proton exchange membrane fuel cell, ultraclean gas-to-liquid (GTL) fuels are of great interest as an alternative source of energy now. Methane is the least reactive and most abandoned natural gas. So, selective oxidative functionalization of methane is of great importance due to the growing energy demand and the depletion of fossil fuel.

Methane may also contain some impurities like ethane, propane, and other gasses like hydrogen sulfide, carbon dioxide, nitrogen etc. the use of natural gas as a feedstock to produce other valuable chemicals is uneconomical because of the costly storage process and the transportation system available at the areas where natural gasses are mostly available. Particularly in recent years many methods has been investigated to produce more valuable products or easily transportable fuels. But the yields are found to be too low and some of them are much more reactive than methane itself. Therefore the produced chemicals are unable to compete with the oil. At this point of time the most useful way to use methane to produce other valuable chemicals is through an intermediate known as synthesis gas. Nowadays several synthesis gas production processes are available according to industrial application. Syngas can be produced by steam reforming of methane, dry reforming of methane, partial oxidation of methane or decomposition of methanol (mainly used in the hydrogen production for the fuel cell because methanol is high in energy density and is also easy to transport).

Dry reforming is one of the process in which synthesis gas is produced with extremely high selectivity. It was first studied by Fischer and Tropsch. They reported that all the gr. (VIII) transition metals are capable of producing synthesis gas by dry reforming. Ni is capable of showing good results for the dry reforming. But the problem with Ni is the rapid deactivation of the catalyst due to sintering and coking of the catalyst. Noble metals like Rh, Ru, Pd, Pt and Ir catalysts are capable of dry reforming with low carbon formation thus less deactivation of the catalyst. But from the industrial point of view it is more preferable to develop a non-noble metal based catalyst to avoid high cost and less availability of the noble metals. Ni based catalyst has drawn very much attraction for the purpose because of its high reactivity and wide availability. There are reports on dry reforming of methane over different solid catalyst but to the best of our knowledge there is no reference for the use of Ni—MgO—ZnO catalyst for this purpose.

Reference may be made to article in the Catalysis Today, 2011, 171, 132-139 by I. Sarusi et. al. where they reported about 15% methane conversion with $CO/H_2$ ration of $\geq 2$ at 500° C. over doped $Rh/Al_2O_3$ catalyst.

Reference can be made to the article in Green Chemistry, 2003, 5, 209-212, where A. Auroux et. al. reported about 70% methane conversion at 600° C. over $Co—MgO/SiO_2$ catalyst with feed ratio $CH_4:CO_2:He=2:1:7$ but the catalyst stability is about 24 hrs.

Reference can be made to the article in Green Chem., 2007, 9, 577-581, where Susan M. Stagg-Williams et. al. reported 28% conversion of methane at 800° C. over 0.5% $Pt—ZrO_2$ catalyst with $CH_4:CO_2$ feed ratio 1:1 comprising of 80% of the feed using $O_2$ permeable ceramic membrane for the $CO_2$ reforming of methane to syngas. The meanwhile it is been observed that the membrane reactor which catalyses the reaction itself get deactivated (50%) after 14 h.

Reference can be made to the article in Catalysis Letters 70 (2000) 117-122, where Malcolm L. H. Green et. al. reported $Mo_2C$ catalysts supported on $SiO_2$ and $Al_2O_3$ with over 90% methane and over 85% $CO_2$ conversion and $H_2/CO$ ratio over 0.95 at 947° C., and 8 bar pressure.

Reference may be made to article in the Catalysis Communication, 2001, 2, 255-260, in which Aika et. al reported the use Ru supported $TiO_2$ catalyst for dry reforming of methane. At industrial condition, at 0.1 MPa and 800° C. the catalyst shows a stable activity for 25 h time on stream with $CO_2$ conversion of ~46%.

Reference may be made to US patent no US2007/0253886A by Abatzoglou and his group. Where they used active metal (mainly Ni) deposited on non-porous metallic and ceramic support; the catalyst shows very high methane conversion of 98% at 800° C. with $H_2/CO$ ratio of 0.98. But the catalyst stability was limited up to 18 h time on stream.

Reference may be made to article in the Chemical Communication, 2001, 415-416 in which Japanese worker Fujimoto and his group reported the production of syngas by pulse irradiation technique on a mixture of $CH_4$ and $CO_2$ at low temperature and atmospheric pressure. They achieved almost 42% methane conversion with $H_2/CO$ ratio of 1.5 with 1:1.5 $CH_4$ to $CO_2$ feed ratio at 180° C. while in presence of Ni—MgO catalyst the same technique gives almost 69% methane conversion while the $H_2/CO$ ration goes down to 0.86 with 1:1 $CH_4$ to $CO_2$ feed ratio.

Reference may also be made to article in the ACS Catalysis, 2012, 2, 1331-1342, in which Chou et al. reported a mesoporous tri-metallic composite of $NiO—CaO—Al_2O_3$ in the dry reforming of methane. In this report they found 89% of methane conversion at 750° C. whereas the GHSV is 15000 ml g-1 h-1. But the $H_2/CO$ ratio is only able to rise up to 0.88 at 750° C.

Reference may be made to article in the Chem. Cat. Chem. 2011, 3, 593-606, where Glaser et. al. reported a highly stable and porous zirconia as support. With 5% Ni supported on $ZrO_2$ they achieved 75% methane conversion at 750° C. with a comparatively slow GHSV of $7.2\times10^4$ ml $h^{-1}$ $g^{-1}$.

All the above prior art indicates a process exhibit sufficiently high conversion and high selectivity of synthesis gas with $H_2$/CO ratio 1, the main drawback of the processes so far reported is the rapid deactivation of the catalyst.

References were also made be to journal Naeem Awais Muhammad. et. al. 2013. International Journal of Chemical Engineering and Applications. Vol. 4(5):315-320), which discuss a polyol process for the production of Nano supported (CeO2, ZrO2 and Al2O)3, Ni catalysts and reforming of methane over such catalysts.

The process in the prior art is different with respect to the use of the Ni—ZnO—MgO catalyst in the present invention which remains activated during reforming of methane upto 100 hrs.

References were also made be to journal Kyoung Soo Jung et al. 1999. Bull. Korean Chem. Soc. Vol. 20(1):89-93, which discloses a fact that the nickel catalysts supported on ZnO and MgO between pH 5 and pH 13 exhibits the enhancement in the activity of reforming of Methane.

The present invention is different from the prior art citation as it discloses a novel process production of Ni—ZnO—MgO which is then used for reforming of methane.

The following are the drawbacks of the hitherto prior art citations which have been addressed in the present invention:

1. Rapid deactivation of the catalyst during reforming of methane,
2. conversion of methane and $CO_2$ to synthesis gas but all the cases the conversion is low at the same time the selectivity is also very low, To overcome this problem many researchers used noble metals like Pt, Ru, Rh, Pd etc. which leads to another boundation the high cost and relatively poor availability of these metals. In this kind of situation Ni based catalyst are considered to be most fruitful. There is, therefore, an evident necessity for further improvements in the Ni based catalyst and process for the dry reforming of methane with carbon dioxide.

Our present invention of Ni—MgO—ZnO catalyst will have the possibility to produce synthesis gas from methane and $CO_2$ with very high selectivity at the same time it will produce synthesis gas with $H_2$ to CO mole ratio of around 1, which can be used for the synthesis of chemicals and also can be directly use for the Fischer-Tropsch synthesis.

OBJECTS OF THE INVENTION

The main object of the present invention is to provide a solid Ni—MgO—ZnO catalyst and a process for the preparation thereof.

Another object of the present invention is to provide a process for vapor phase reforming of methane with carbon dioxide for the production of synthesis gas over Ni—MgO—ZnO catalyst.

Yet another object of the present invention is to provide a process, which selectively gives synthesis gas from methane and carbon dioxide with $H_2$/CO ratio equal to 1.

Yet another object of the present invention is to provide a process which can effectively utilize the abundantly available greenhouse gasses methane and carbon dioxide.

Yet another object of the present invention is to provide a process which works continuously more than 100 h without any deactivation of the catalyst under continuous process for the production of synthesis gas from dry reforming of methane at atmospheric pressure.

Yet another object of the present invention is to provide a Ni based catalyst supported on MgO—ZnO and which can be prepared easily and economically to produce synthesis gas by reforming of methane with $CO_2$.

Yet another object of the present invention is to provide a process which works selectively under simple operating condition.

SUMMARY OF THE INVENTION

Accordingly, present invention provides a Ni—MgO—ZnO solid catalyst comprising:
a) Ni in the range of 2-10%,
b) MgO in the range of 2-10% and
c) ZnO in the range of 90-95%.

In an embodiment of the present invention, said catalyst is useful for reforming of methane to obtain syngas.

In another embodiment, present invention provides a process for the preparation of Ni—MgO—ZnO catalyst and the said process comprising the steps of:
i. dissolving Zinc nitrate hexahydrate and Magnesium nitrate hexahydrate in water,
ii. adding Nickel nitrate hexahydrate in water to the mixture as obtained in step (i) followed by stirring to obtain a homogenous mixture;
iii. adding a solution of CTAB (cetyltrimethylammonium bromide) in ethanol to the mixture as obtained in step (ii) with stirring for period in the range of 1 to 2 hour followed by adding hydrazine hydrate with adjusting the pH of the solution in the range of 8-12 to obtain a solution,
iv. stirring the solution as obtained in step (iii) for period in the range of 1-3 hour followed by autoclaving for period in the range of 12 to 48 hours at temperature in the range of 160 to 180° C. to obtain a precipitate;
v. filtering the precipitate as obtained in step (iv) with water and drying at temperature ranging between 60 to 110° C. for a time period ranging between 12-20 hours followed by calcining at a temperature in the range of 400-750° C. for a time period in the of 4-8 hours to obtain Ni—MgO—ZnO catalyst.

In yet another embodiment of the present invention, weight of Ni to ZnO varied in the range between 2-10%.

In yet another embodiment of the present invention, weight of MgO to ZnO varied in the range between 2-10%.

In yet another embodiment of the present invention, the Ni to Ni—MgO—ZnO of the catalyst varied in the range of 2 to 10%.

In another embodiment, present invention provides a process for the reforming of methane to obtain the syngas using the Ni—ZnO—MgO catalyst comprising the steps of:
i. dry reforming of methane in a fixed-bed down flow reactor using methane (99.999% of purity), carbon dioxide and Helium (He) at temperature in the range of 600-800° C. for period in the range of 1 to 100 h under 1 atmospheric pressure and gas hourly space velocity (GHSV) varying between 5000 $mlg^{-1}$ $h^{-1}$ to 550000 $mlg^{-1}h^{-1}$ with a molar ratio of $CH_4$:$CO_2$:He of 1:1:12.

In yet another embodiment of the present invention, the reaction time is preferably in the range of 1-100 hr without any deactivation of the catalyst.

In yet another embodiment of the present invention, the conversion of methane is in the range of 5-99%.

In yet another embodiment of the present invention, the $H_2$/CO ratio of syngas obtained is in the range of 0.83-1.2.

In yet another embodiment of the present invention, feed ratio of $CH_4$, $CO_2$ and He is 1:1:12.

DETAILED DESCRIPTION OF THE INVENTION

Figure 1:
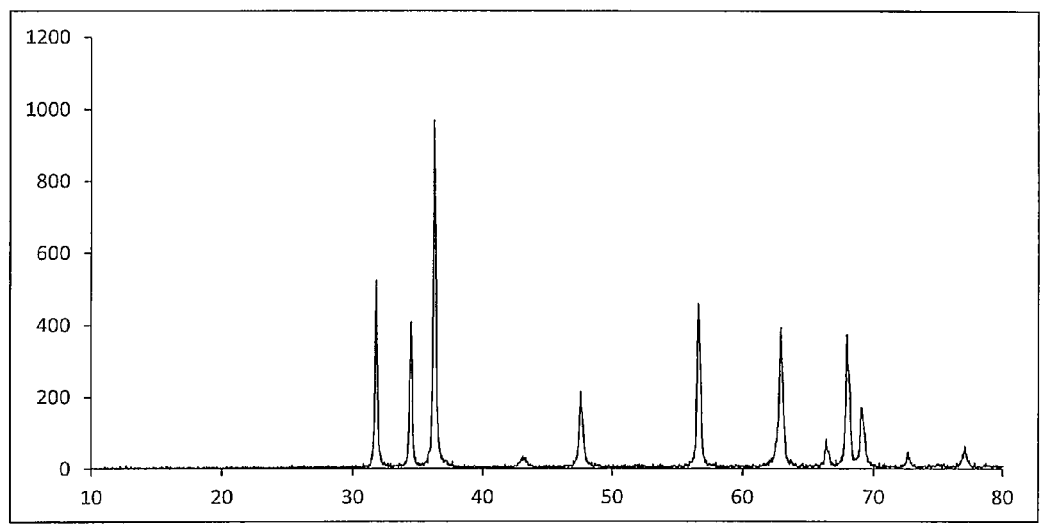
FIG. 1 represents X-ray Diffraction (XRD) of 5% Ni-5% MgO—ZnO.

The present invention provides a Ni—MgO—ZnO solid catalyst useful for reforming of methane to obtain the desired syngas, said catalyst comprising of Ni in the range of 2-10%, MgO in the range of 2-10% and ZnO in the range of 90-95%.

The present invention provides a process for the preparation of Ni—MgO—ZnO solid catalyst involves the following steps:
a) The precursor salts of Zinc nitrate hexahydrate and Magnesium nitrate hexahydrate was dissolved in required volume of water.
b) The solution of Nickel nitrate hexahydrate in water was added to the previous mixture of solution.
c) The whole mixture was stirred well to mix the precursors homogeneously.
d) The solution of CTAB (cetyltrimethylammonium bromide) in ethanol was added to the mixture solution.
e) The whole mixture was stirred for 1-2 hour and then a few ml of hydrazine hydrate is added.
f) The pH of the solution was adjusted to about 8-12 using 1(M) $Na_2CO_3$ solution.
g) The mixture solution was continued stirring for 1-3 h. to form a thick gel like mixture.
h) The mixture was then taken into an autoclave and kept for 12-48 hrs. at 180° C.
i) The autoclave was taken out from oven and cooled to room temperature.
j) The precipitate was then washed with water and dried at 100° C. overnight for 12-20 h.
k) The obtained solid was calcined at 550° C. to obtained Ni—ZnO—MgO catalyst.

production of syngas from dry reforming of methane under atmospheric pressure is carried out over the obtained Ni—ZnO—MgO catalysts in a fixed bed down-flow reactor using methane (99.999% of purity) and carbon dioxide (9.9% of purity balanced He) as feeds for 1 to 100 h to get syngas. The process pressure is kept at 1 atm and the reaction temperature is preferably in the range 600-800° C. is used. The methane conversion is obtained 5-99 mol % and $H_2$/CO ratio of syngas obtained is in the range of 0.83-1.2.

Accordingly the present invention provides an improved process for the reforming of methane with carbon dioxide to produce synthesis gas under atmospheric pressure at a temperature range 600-800° C. with a Gas Hourly Space Velocity (GHSV, for/g catalyst/hr.) in the range of 5000-550000 ml g-1 h-1 in the presence of Ni: MgO—ZnO with Ni in the range 2-10% and MgO in the range of 2-10% to obtain desired syngas for a period of 1 to 100 h.

The wt % of Ni to ZnO of the catalyst varied in the range of 2-10%.

The feed ratio in the reaction is $CH_4:CO_2:He=1:1:12$.

EXAMPLES

Following examples are given by way of illustration and therefore should not be construed to limit the scope of the invention.

Example-1

Preparation of 5% Ni-5% MgO—ZnO

An aqueous (20 ml water) solution of Nickel nitrate hexahydrate (1.54 g) was added with another aqueous (40 ml) solution of Zinc nitrate hexahydrate (22.4 g) and Magnesium nitrate hexahydrate (0.96 g). Then an ethanolic (20 ml) solution of CTAB (cetyltrimethylammonium bromide) (1.7 g) was added to the mixture solution after mixing the all solution homogeneously. The solution was then continued stirring for 1 h. before adding 40 drops of hydrazine hydrate. The pH of the solution was maintained to about 9-10 using 1(M) $Na_2CO_3$ solution. The whole mixture solution was then continued stirring for 1 h. to form a gel like mixture. The whole mixture was then put into an autoclave and kept at 180° C. for 24 hrs. After taking out the autoclave from oven the autoclave was cooled to room temperature. The ppt was then washed with water and dried at 100° C. overnight. The obtained solid was calcined at 550° C.

Figure 2:
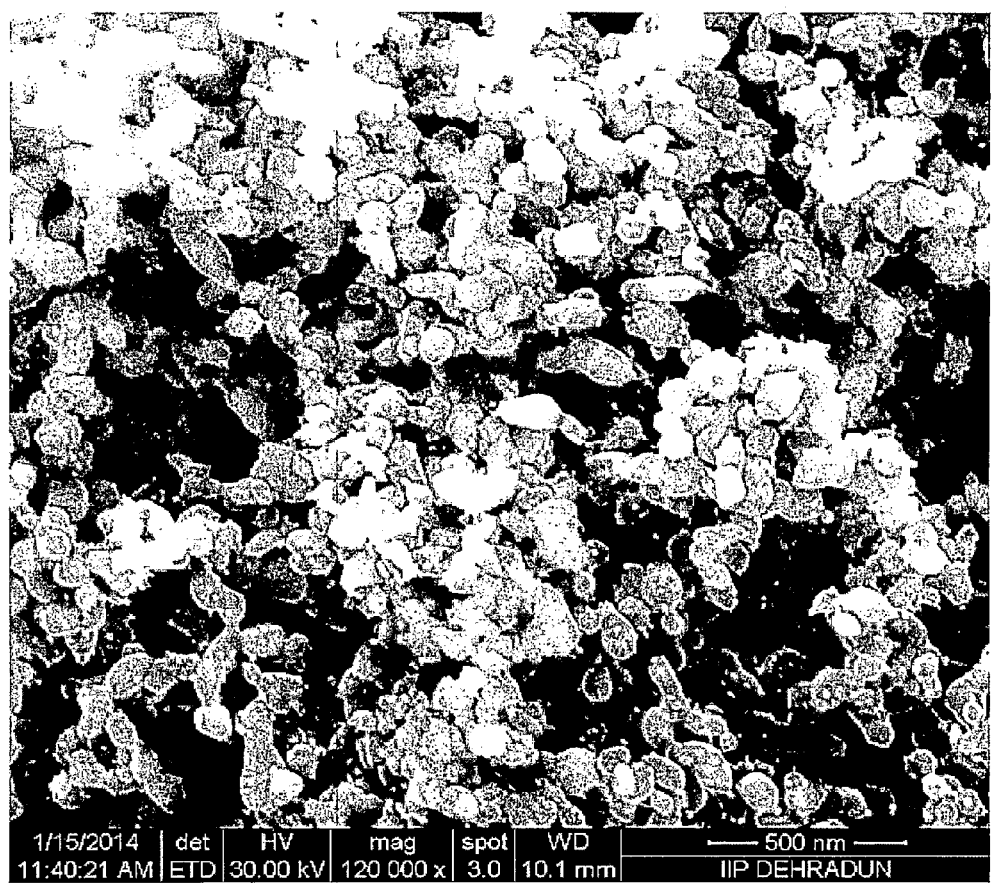
FIG. 2 represents Scanning Electron Microscope (SEM) image of 5% Ni-5% MgO—ZnO.
Figure 3:
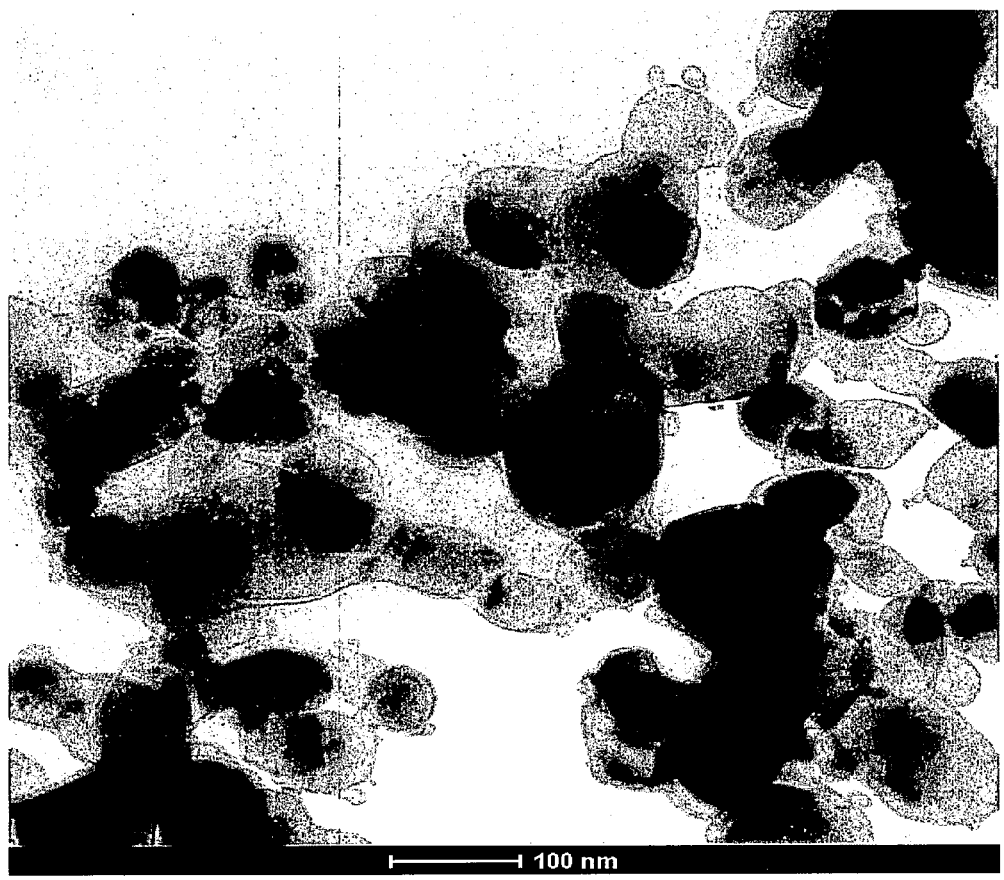
FIG. 3 represents Low magnification Transmission Electron Microscope (TEM) image of 5% Ni-5% MgO—ZnO.
Figure 4:
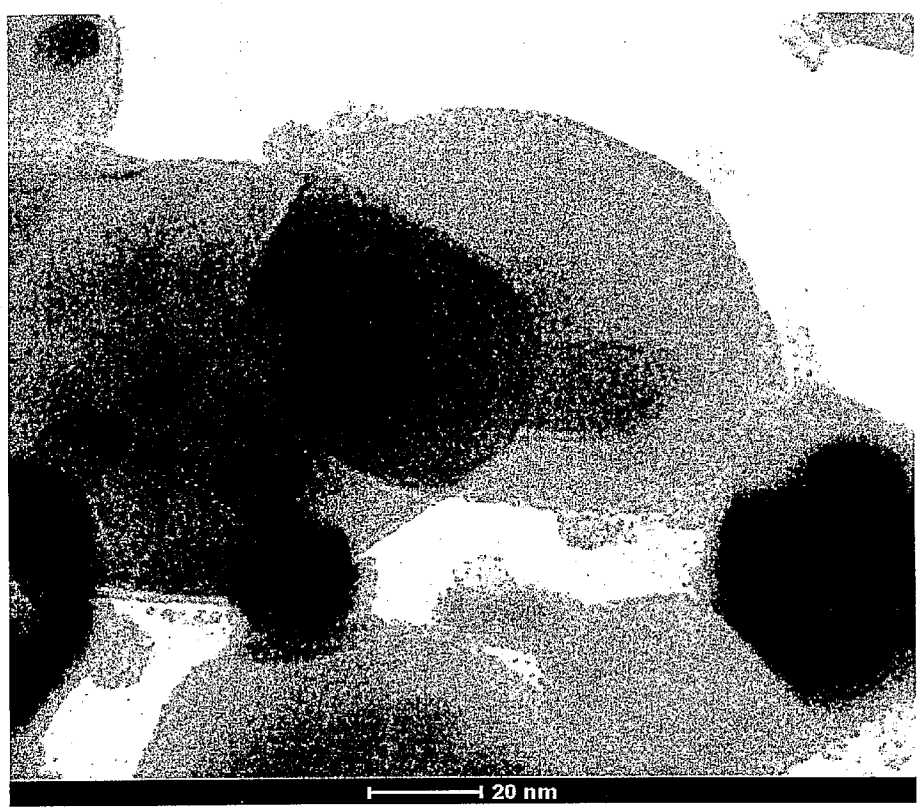
FIG. 4 represents High magnification TEM image of 5% Ni-5% MgO—ZnO.
Figure 5:
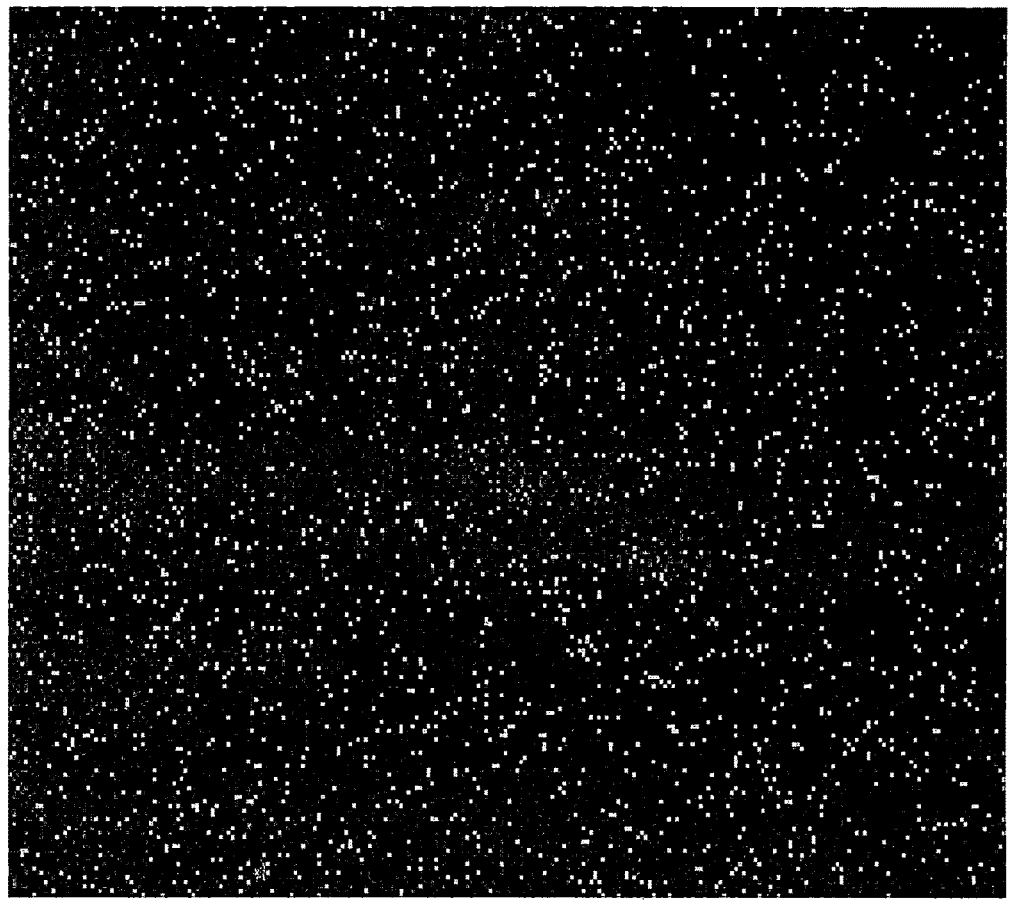
FIG. 5 represents Mapping of Zn in 5% Ni-5% MgO—ZnO.
Figure 6:
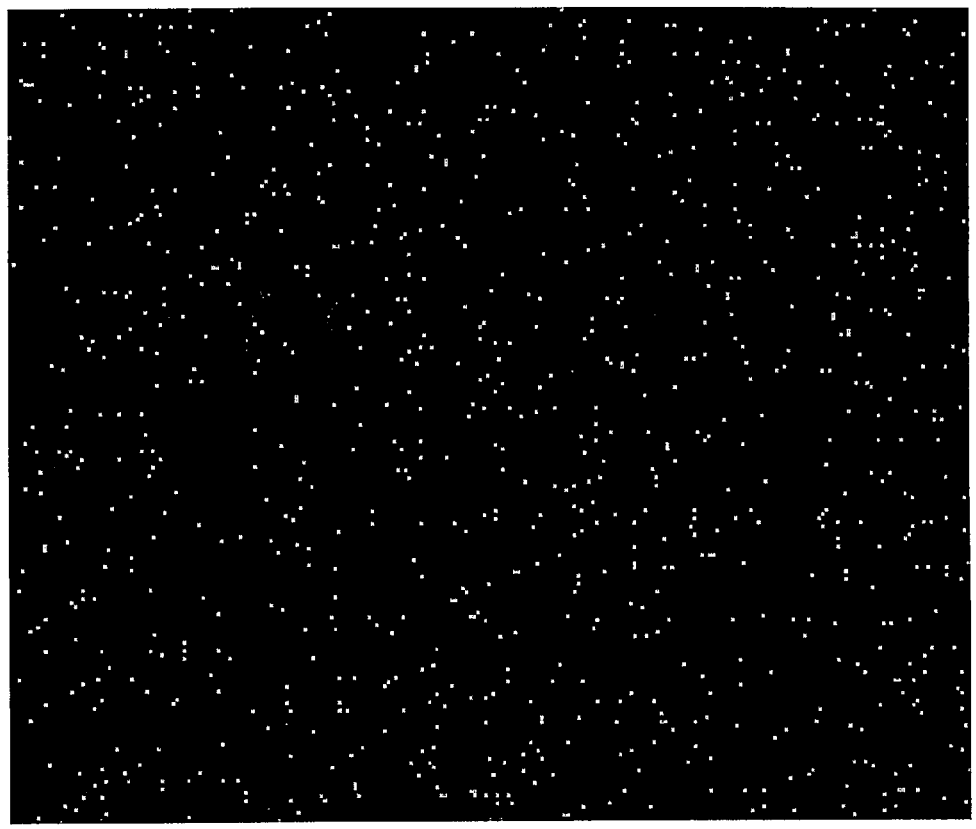
FIG. 6 represents Mapping of Mg in 5% Ni-5% MgO—ZnO.
Figure 7:
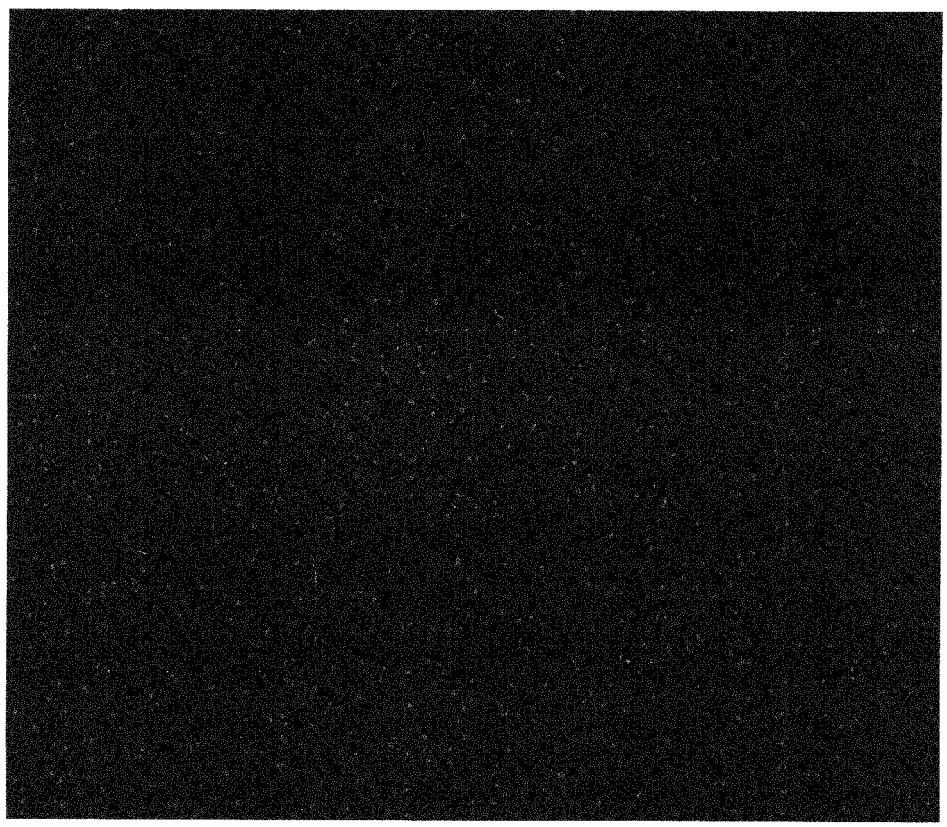
FIG. 7 represents Mapping of Ni in 5% Ni-5% MgO—ZnO.
Figure 8:
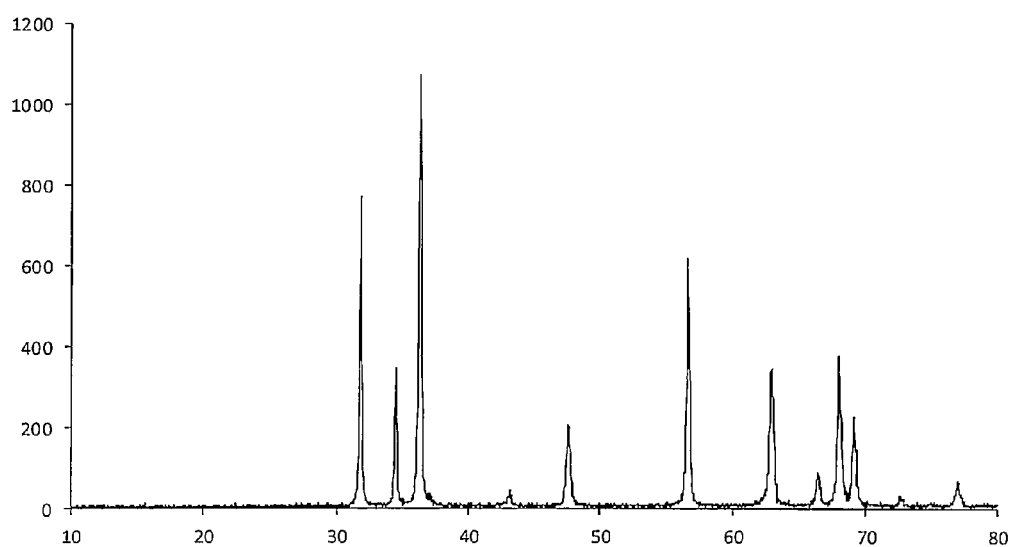
FIG. 8 represents X-ray Diffraction (XRD) of 2.5% Ni-5% MgO—ZnO.
Figure 9:
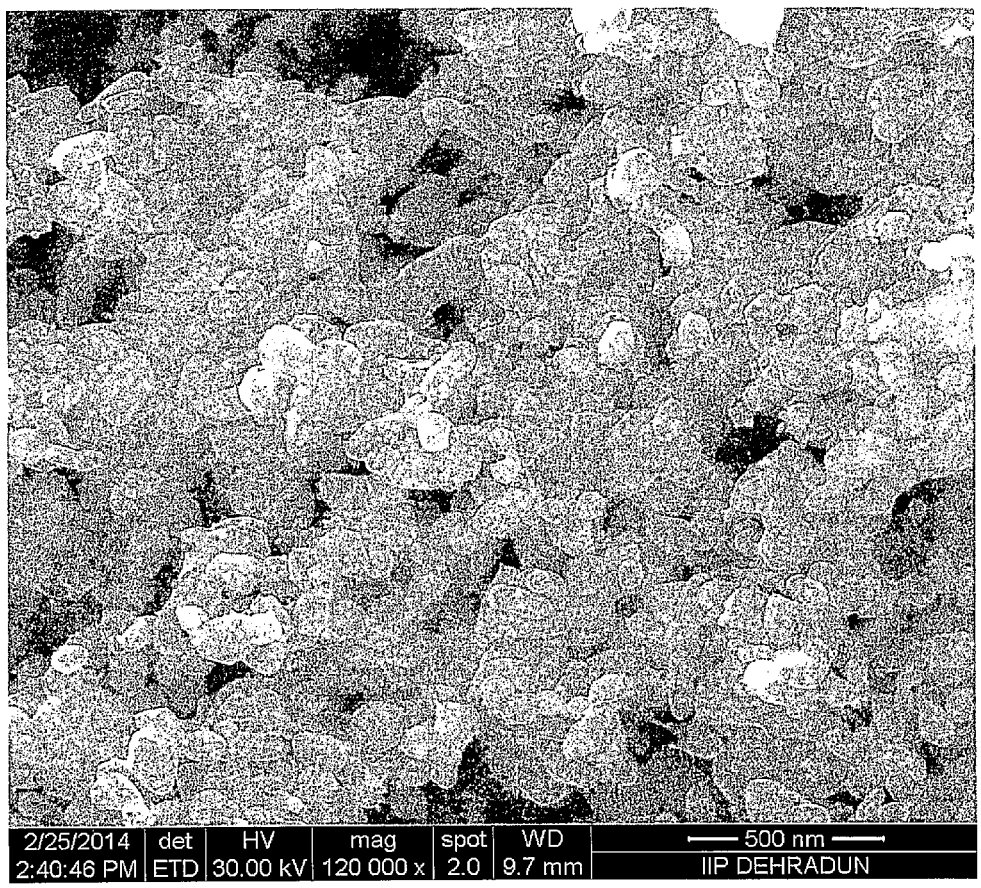
FIG. 9 represents SEM image of 2.5% Ni-5% MgO—ZnO.
Figure 10:
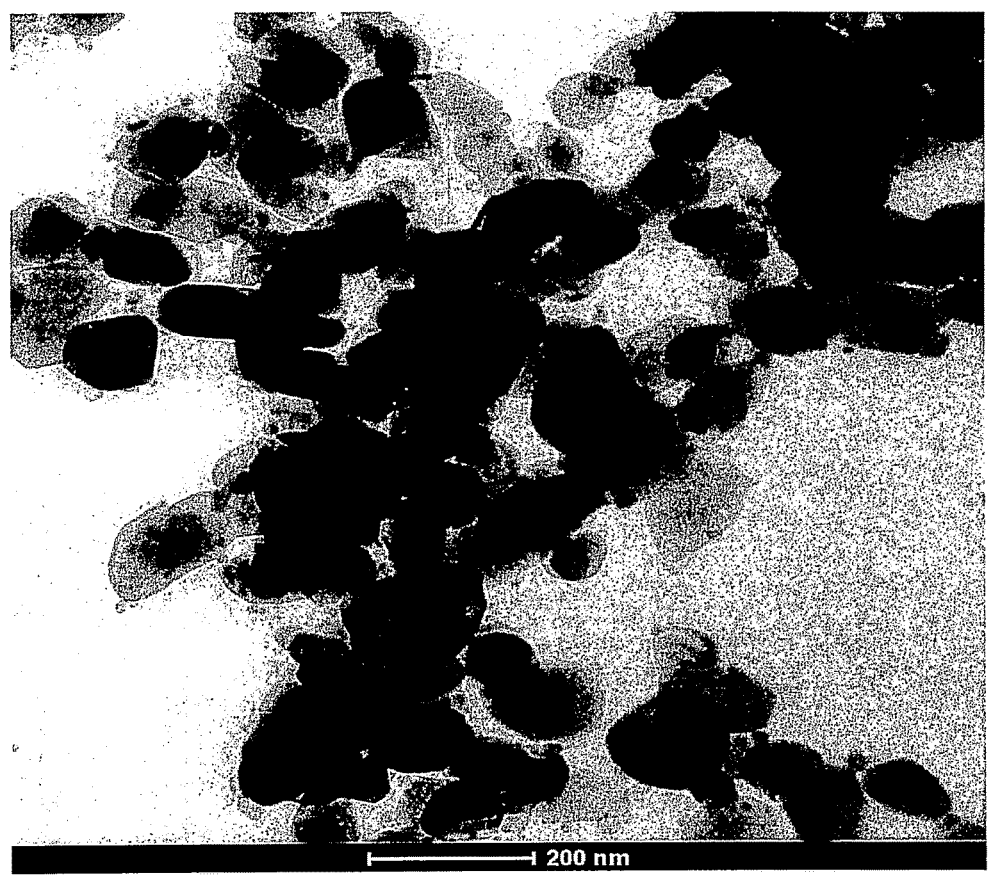
FIG. 10 represents Low magnification TEM image of 2.5% Ni-5% MgO—ZnO.
Figure 11:
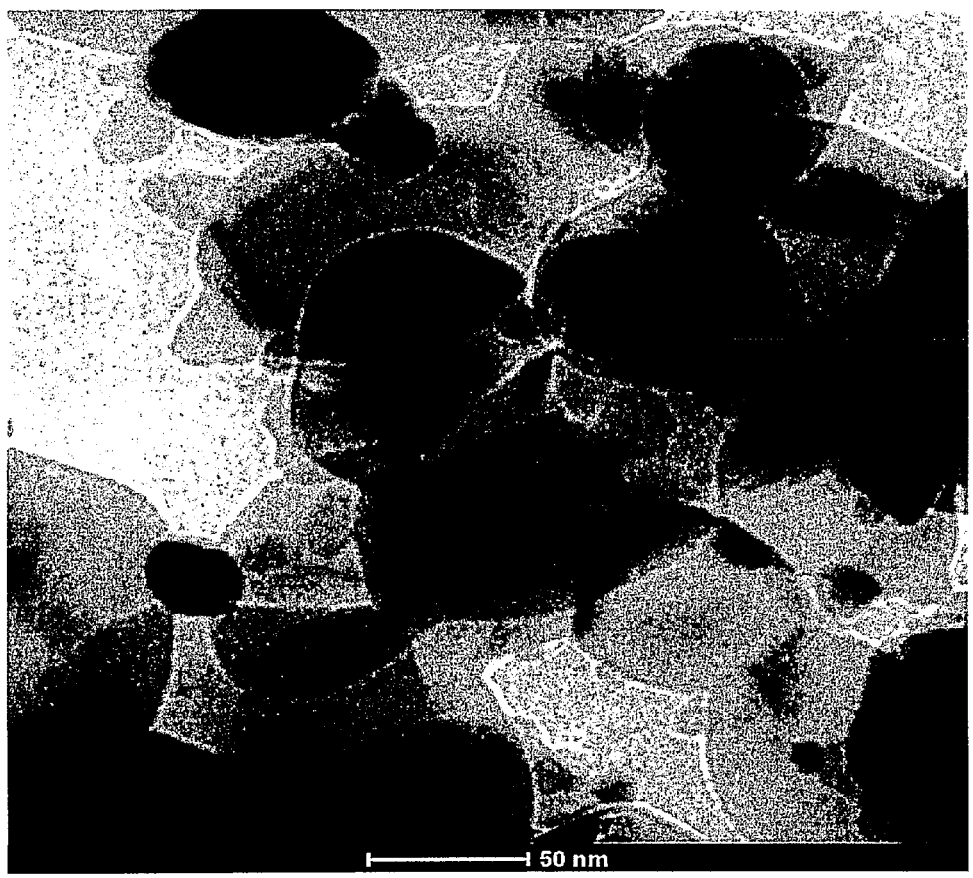
FIG. 11 represents High magnification TEM image of 2.5% Ni-5% MgO—ZnO.
Figure 12:
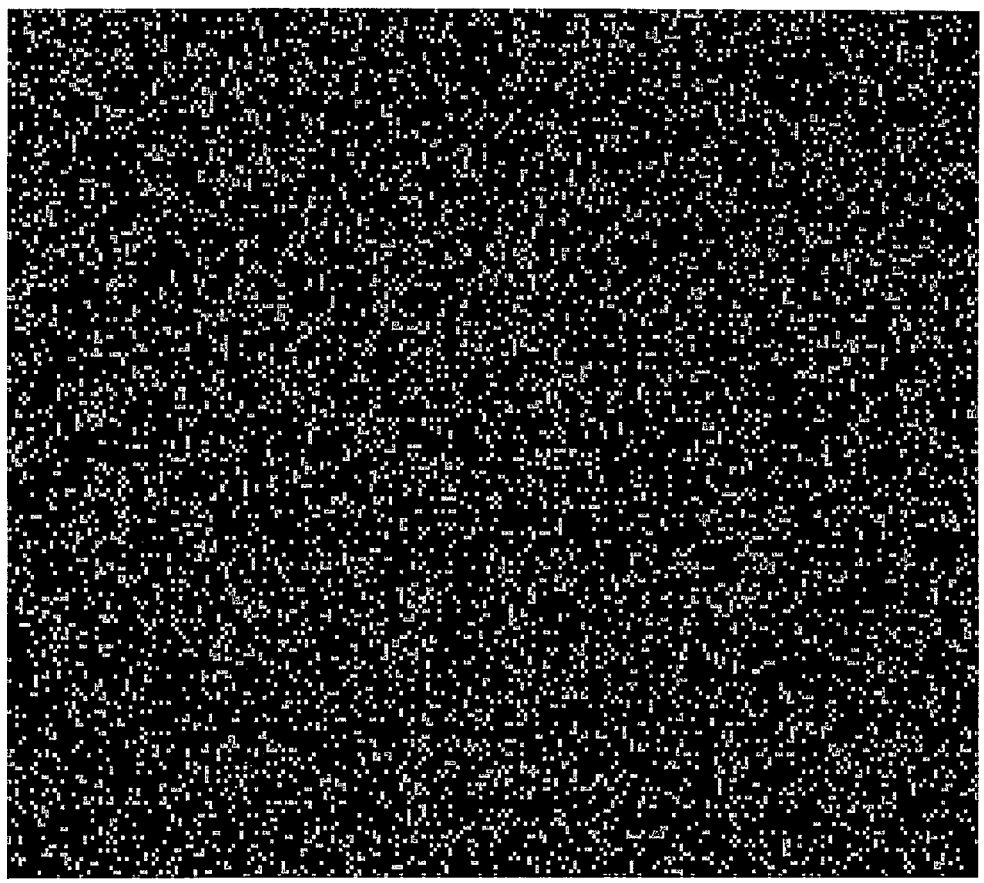
FIG. 12 represents Mapping of Zn in 2.5% Ni-5% MgO—ZnO.
Figure 13:
FIG. 13 represents Mapping of Mg in 2.5% Ni-5% MgO—ZnO.
Figure 14:
FIG. 14 represents Mapping of Ni in 2.5% Ni-5% MgO—ZnO.

The material was characterized by XRD, SEM, Elemental mapping and TEM. The XRD image as in FIG. 1 reveals the presence of NiO, ZnO, and MgO in the prepared sample. SEM image as indicated in FIG. 2 and elemental mapping shows that the catalyst particles are in the nanoparticle range and Ni is uniformly distributed in the sample. The TEM images as indicated FIG. 3 reveal that the nanoparticles are in the range between 50-100 nm.

Example 2

Preparation of 5% Ni-5% MgO—ZnO

An aqueous (10 ml water) solution of Nickel nitrate hexahydrate (0.39 g) was added with another aqueous (20 ml) solution of Zinc nitrate hexahydrate (11.4 g) and Magnesium nitrate hexahydrate (0.48 g). Then an ethanolic (5 ml) solution of CTAB (cetyltrimethylammonium bromide) (0.43 g) was added to the mixture solution after mixing the all solution homogeneously. The solution was then continued stirring for 1 h. before adding 10 drops of hydrazine hydrate. The pH of the solution was maintained to about 9-10 using 1(M) $Na_2CO_3$ solution. The whole mixture solution was then continued stirring for 1 h. to form a gel like mixture. The whole mixture was then put into an autoclave and kept at 180° C. for 24 hrs. After taking out the autoclave from oven the autoclave was cooled to room temperature. The ppt was then washed with water and dried at 100° C. overnight. The obtained solid was calcined at 550° C. The material was characterized by XRD, SEM, Elemental mapping and TEM. The XRD reveals the presence of NiO, ZnO, and MgO in the prepared sample. SEM image and elemental mapping shows that the catalyst particles are in the nanoparticle range and Ni is uniformly distributed in the sample. The TEM images reveal that the nanoparticles are in the range between 50-100 nm.

Example 3

General Procedure for the Dry Reforming of Methane

The dry reforming of methane was carried out in a fixed-bed down flow reactor at atmospheric pressure. Typically 15-300 mg of catalyst was placed in between two quartz wool plugged in the center of the 6 mm quartz reactor. Dry reforming of methane was carried out at different temperature (600-800° C.). The gas hourly space velocity (GHSV) was varied between 5000 $mlg^{-1} h^{-1}$ to 550000 $mlg^{-1}h^{-1}$ with a molar ratio of $CH_4:CO_2:He$ of 1:1:12. The reaction products were analyzed using an online gas chromatography (Agilent 7890A) fitted with a TCD detector using two different columns Molecular sieves (for analysing $H_2$) and PoraPack-Q (for analysing $CH_4$, $CO_2$ and CO).

Example 4

The example describes the effect of temperature on conversion and $H_2/CO$ ratio of dry reforming of methane. The product analysis presented in Table-1.
Process Conditions:
Catalyst: 0.24 g
Ni:MgO:ZnO weight ratio in the catalyst=5:5:95
Reaction time: 7 h
Process pressure=1 atm.
Gas hourly space velocity (GHSV): 30000 ml g-1 h-1

TABLE 1

Effect of temperature on conversion of methane and $H_2/CO$ ratio of dry reforming of methane

| Catalyst | GHSV ($mlg^{-1}h^{-1}$) | Temperature (° C.) | Methane Conversion (%) | $CO_2$ Conversion (%) | $H_2/CO$ ratio |
|---|---|---|---|---|---|
| 5% Ni:5% MgO—ZnO | 30000 | 600 | 1.0 | 1.1 | — |
| | 30000 | 700 | 70.7 | 72.7 | 0.97 |
| | 30000 | 800 | 99.4 | 92.3 | 1.17 |

Example 5

The example describes the effect of gas hourly space velocity on the conversion of methane and $H_2/CO$ ratio of dry reforming of methane. The product analysis presented in Table-2.
Process Conditions:
Catalyst: 0.015 g
Ni:MgO:ZnO weight ratio in the catalyst=5:5:95.
Process pressure: 1 atm
Temperature: 800° C.
Reaction time: 7 h

TABLE 2

Effect of temperature on conversion of methane and $H_2/CO$ ratio of dry reforming of methane

| Catalyst | GHSV ($mlg^{-1}h^{-1}$) | Temperature (° C.) | Methane Conversion (%) | $CO_2$ Conversion (%) | $H_2/CO$ ratio |
|---|---|---|---|---|---|
| 5% Ni:5% MgO—ZnO | 550000 | 600 | 8.5 | 5.8 | 0.82 |
| | 550000 | 700 | 27.1 | 34.4 | 0.88 |
| | 550000 | 800 | 47.6 | 58.8 | 0.83 |

Example 6

The example describes the effect of gas hourly space velocity on the conversion of methane and $H_2/CO$ ratio of dry reforming of methane. The product analysis presented in Table-3.
Process Conditions
Catalyst: 0.015 g
Ni:MgO:ZnO weight ratio in the catalyst=5:5:95.
Process pressure: 1 atm
Temperature: 800° C.
Reaction time: 7 h

TABLE 3

Effect of GHSV on conversion and $H_2/CO$ ratio of dry reforming of methane

| Catalyst | Temperature (° C.) | WHSV ($mlg^{-1}h^{-1}$) | Methane Conversion (%) | $CO_2$ Conversion (%) | $H_2/CO$ ratio |
|---|---|---|---|---|---|
| 5% Ni:5% MgO—ZnO | 800 | 550000 | 47.6 | 58.8 | 0.83 |
| | 800 | 250000 | 52.3 | 72.6 | 0.81 |
| | 800 | 150000 | 99.2 | 99.5 | 0.99 |
| | 800 | 100000 | 99.5 | 90.3 | 1.20 |
| | 800 | 30000 | 99.4 | 92.3 | 1.17 |

Example 7

The example describes the effect of time on stream on conversion of methane and $H_2/CO$ ratio of dry reforming of methane. The product analysis presented in Table 4.
Process Conditions:
Catalyst: 0.24 g
Ni:MgO:ZnO weight ratio in the catalyst=5:5:95
Process pressure: 1 atm
Gas hourly space velocity (GHSV): 30000 ml g-1 h-1
Reaction temperature: 800° C.

TABLE 4

Effect of Time on Stream on conversion and $H_2/CO$ ratio of dry reforming of methane

| Catalyst | Time ($h^{-1}$) | Temperature (° C.) | WHSV ($mlg^{-1}h^{-1}$) | Methane Conversion (%) | $CO_2$ Conversion (%) | $H_2/CO$ ratio |
|---|---|---|---|---|---|---|
| 5%Ni:5% MgO—ZnO | 0 | 800 | 30000 | 89.4 | 83.7 | 1.17 |
| | 1 | 800 | 30000 | 89.0 | 84.1 | 1.16 |
| | 2 | 800 | 30000 | 89.2 | 84.8 | 1.15 |
| | 3 | 800 | 30000 | 90.6 | 85.9 | 1.13 |
| | 4 | 800 | 30000 | 95.7 | 90.5 | 1.13 |

TABLE 4-continued

Effect of Time on Stream on conversion and $H_2/CO$ ratio of dry reforming of methane

| Catalyst | Time (h$^{-1}$) | Temperature (° C.) | WHSV (mlg$^{-1}$h$^{-1}$) | Methane Conversion (%) | CO$_2$ Conversion (%) | H$_2$/CO ratio |
|---|---|---|---|---|---|---|
| | 5 | 800 | 30000 | 99.4 | 92.3 | 1.15 |
| | 6 | 800 | 30000 | 99.5 | 92.2 | 1.15 |
| | 7 | 800 | 30000 | 99.4 | 92.3 | 1.15 |
| | 8 | 800 | 30000 | 99.4 | 92.4 | 1.15 |
| | 9 | 800 | 30000 | 99.4 | 92.4 | 1.15 |
| | 10 | 800 | 30000 | 99.4 | 92.5 | 1.15 |
| | 12 | 800 | 30000 | 99.4 | 92.3 | 1.15 |
| | 14 | 800 | 30000 | 99.4 | 92.3 | 1.15 |
| | 16 | 800 | 30000 | 99.4 | 93.6 | 1.15 |
| | 18 | 800 | 30000 | 99.4 | 92.3 | 1.15 |
| | 20 | 800 | 30000 | 99.4 | 92.5 | 1.15 |
| | 25 | 800 | 30000 | 99.4 | 92.4 | 1.15 |
| | 30 | 800 | 30000 | 99.3 | 92.2 | 1.15 |
| | 35 | 800 | 30000 | 99.4 | 92.5 | 1.15 |
| | 40 | 800 | 30000 | 99.5 | 91.3 | 1.15 |
| | 45 | 800 | 30000 | 99.3 | 92.9 | 1.15 |
| | 50 | 800 | 30000 | 99.3 | 92.9 | 1.15 |
| | 55 | 800 | 30000 | 99.2 | 92.2 | 1.15 |
| | 60 | 800 | 30000 | 99.2 | 91.3 | 1.16 |
| | 65 | 800 | 30000 | 99.3 | 91.2 | 1.16 |
| | 70 | 800 | 30000 | 99.2 | 91.1 | 1.16 |
| | 80 | 800 | 30000 | 99.2 | 91.4 | 1.16 |
| | 90 | 800 | 30000 | 99.2 | 92.1 | 1.16 |
| | 100 | 800 | 30000 | 99.2 | 92.1 | 1.16 |

ADVANTAGES OF THE INVENTION

The main advantages of the present invention are:
a) The process of the present invention is to utilize two major greenhouse gasses $CH_4$ and $CO_2$ to convert to syngas by dry reforming in a single step with a single catalyst.
b) The process provides not only good conversion but also good $H_2/CO$ ratio of syngas.
c) The process uses very dilute feed with ratio $CH_4:CO_2$: He=1:1:12.
d) The process utilizes two major greenhouse gases at a time to produce syngas with $H_2/CO$ ratio almost equal to unity, which can be further used for the production of valuable chemicals.
e) The process does not produce any major by-products which is also a major advantage of this process.
f) The catalyst shows no deactivation up to 100 h time on stream at 800° C.; which supports the thermal stability of the catalyst.
g) The catalyst is used in very low amounts.

We claim:
1. A process for the preparation of a Ni—MgO—ZnO solid catalyst, the catalyst comprising:
a) Ni in the range of 2-10%,
b) MgO in the range of 2-10% and
c) ZnO in the range of 90-95%,
wherein the said process comprises the steps of:
i. dissolving Zinc nitrate hexahydrate and Magnesium nitrate hexahydrate in water,
ii. adding Nickel nitrate hexahydrate in water to the mixture as obtained in step (i) followed by stirring to obtain a homogenous mixture;
iii. adding a solution of CTAB (cetyltrimethylammonium bromide) in ethanol to the mixture as obtained in step (ii) with stirring for period in the range of 1 to 2 hours followed by adding hydrazine hydrate with adjusting the pH of the solution in the range of 8-12 to obtain a solution,
iv. stirring the solution as obtained in step (iii) for a period in the range of 1-3 hours followed by autoclaving for period in the range of 12 to 48 hours at a temperature in the range of 160 to 180° C. to obtain a precipitate;
v. filtering the precipitate as obtained in step (iv) with water and drying at a temperature ranging between 60 to 110° C. for a time period ranging between 12-20 hours followed by calcining at a temperature in the range of 400-750° C. for a time period of 4-8 hours to obtain the Ni—MgO—ZnO catalyst.

2. The process as claimed in claim 1, wherein the Ni to Ni—MgO—ZnO of the catalyst varied in the range of 2 to 10%.

* * * * *